Jan. 3, 1967  N. A. TRUSLOW  3,296,062
BELT FABRIC
Filed June 24, 1965
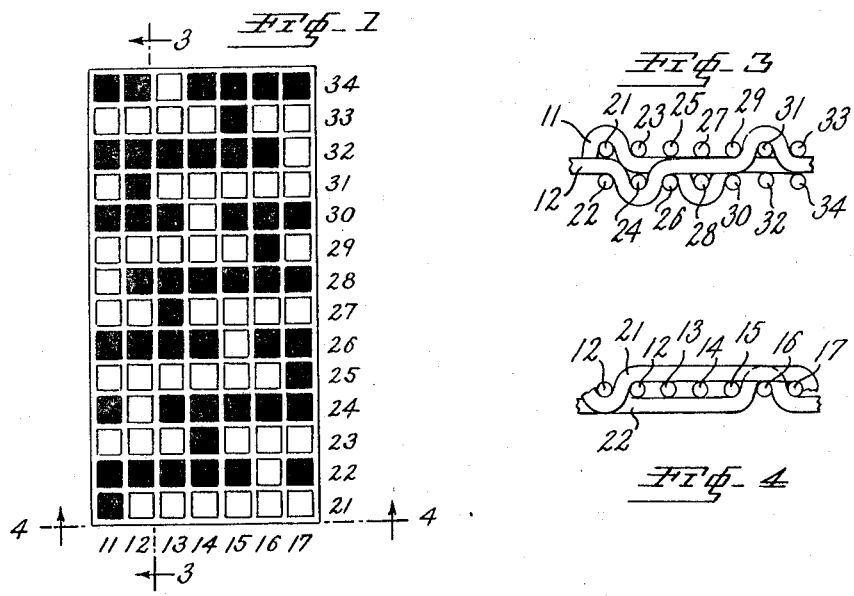
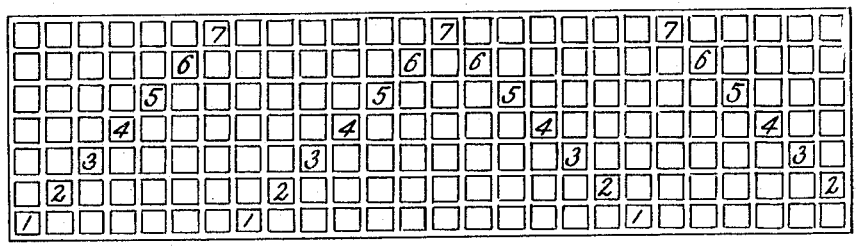
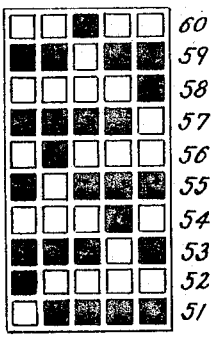
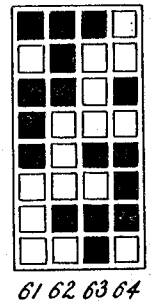
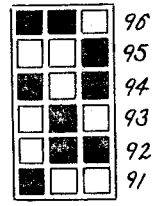
INVENTOR.
NEAL A. TRUSLOW
BY
ATTORNEY

United States Patent Office

3,296,062
Patented Jan. 3, 1967

3,296,062
BELT FABRIC
Neal A. Truslow, Winnsboro, S.C., assignor to United States Rubber Company, New York, N.Y., a corporation of New Jersey
Filed June 24, 1965, Ser. No. 466,644
11 Claims. (Cl. 161—91)

This invention relates to a high strength duck fabric useful as reinforcing for industrial belting, as high strength tape such as automotive seat belts, and the like.

Industrial conveyor belts and power transmission belts are commonly made with a woven fabric carcass and an elastomeric wear surface such as natural or synthetic rubber, polyvinyl chloride resin, polyurethane rubber, or the like. The reinforcing fabric contributes a high measure of strength to the composite structure, but efforts have been continuous to increase the strength contributed by such reinforcing fabrics while at the same time reducing the weight and stiffness caused by such reinforcement, and to limit the stretch of the composite structure by limiting the stretch of the reinforcing fabric.

In the past, fabrics of the type contemplated herein have been woven of a variety of different fibers in a variety of weaves. However they have generally been characterized by having tight weaves using two harnesses that require heavy looms. The majority of belt ducks for power transmission belts have been woven in plain weaves. Frequently in order to weave a sufficiently tight construction, it has been necessary to weave a lighter than desired fabric, and when this was done it was necessary to adhere several plies of fabric together to build up the strength desired in the finished belt.

Another belt duck which has been used in the past is that which is sometimes called "solid-woven belting." This fabric requires a special loom, but the fabric is sufficiently heavy and strong that a single ply often will suffice as reinforcement for a belt. "Solid-woven belting" fabrics normally are woven from more than one set of warps, and the weaves consist of some warps weaving normally while other "binder" warps are used to interlace through the fabric and thereby hold the entire construction together.

In a third type of fabric used to reinforce belts some warps have an appreciable float and other warps weave plain.

The instant invention relates to a novel type of fabric which is especially useful as a reinforcing fabric. The fabric in accordance with this invention comprises high strength multi-filament warp yarns having a twist multiple less than about 2.0, and weft yarns interlaced therewith. When the fabric is to be used for reinforcing rubber, plastic or the like, such as belts, the weft yarns are formed of a material to which the reinforcement adheres strongly. A variety of materials are available which could be used for the high strength warp warns; polyamide (nylon), polyester, glass and viscose are suitable. Similarly a number of yarns suitable for use as wefts are known; for example viscose filaments, cotton, nylon treated with resorcinol formaldehyde latex to improve its adhesion to rubber, and the like would be satisfactory.

The warp and weft yarns are interwoven in a weave in which each weft yarn appears on only one side of the fabric and alternate weft yarns float predominantly on opposite sides of the fabric. The warp yarns, although they appear at opposite sides of the fabric to tie the aforesaid wefts to the fabric, nonetheless are disposed predominantly in the fabric center and regularly pass interiorly of at least two consecutive weft yarns at each side of the fabric.

The reinforcing fabrics according to this invention have numerous advantages. Inasmuch as the weft yarns float predominantly at the surfaces of the fabric, the wefts can be chosen for their adhesion to the material to be reinforced while the warps can be selected to give the desired strength, stretch and other properties to the fabric. The warps have a very low crimp and consequently the fabric has a low stretch in the warp direction. Less material is used for a given length of fabric because of the low and uniform crimp. The fabric can be produced more cheaply because it can be produced on high speed automatic looms, and the fabric has better flex endurance and a smooth surface hence it may be easily coated.

For a better understanding of this invention, reference should be had to the following detailed description of specific embodiments thereof, when read in conjunction with the accompanying drawings wherein:

FIG. 1 is a dobby chain draft, which also represents the weave diagram, of one specific embodiment of fabric in accordance with this invention;

FIG. 2 is a drawing-in draft for the fabric of FIG. 1;

FIG. 3 is a cross-section of the fabric illustrated in FIG. 1 taken along a section represented by the line 3—3 of FIG. 1;

FIG. 4 is a cross-section of the fabric illustrated in FIG. 1 taken along a section represented by the line 4—4 in FIG. 1;

FIG. 5 is a dobby chain draft, which also represents the weave diagram, of a second embodiment of a fabric in accordance with this invention;

FIG. 6 is a dobby chain draft, which also represents the weave diagram, of a third embodiment of a fabric in accordance with this invention, and FIG. 7 is a dobby chain draft, which also represents the weave diagram, of a fourth embodiment of a fabric in accordance with this invention.

Referring now to the drawings, and particularly to FIGS. 1, 3 and 4, a reinforcing fabric based on a seven harness sateen weave chain draft repeating on seven warps and fourteen wefts is disclosed. For ease in understanding the invention, the seven horizontal positions on the dobby chain draft have been numbered consecutively from 11 through 17, and the fourteen vertical positions on the dobby chain draft have been numbered consecutively from 21 through 34. The numbers 11 through 17 each may be considered to represent a warp yarn and the numbers 21 through 34 each may be considered to represent a weft yarn. As is customary in preparing these chain drafts, whenever a dark square appears in the diagram the particular warp yarn in whose row that dark square is found overlies the particular weft yarn in whose row that dark square is found.

Referring to FIGS. 3 and 4, it will be noted that, for example, warp 11 passes over wefts 21 and 22. It then passes under wefts 23, 25, 27, 29, 31 and 33, and in the same distance it passes over wefts 24 and 26, but under weft 28, and over wefts 30, 32 and 34. Warp 12 passes over weft 22 and under weft 24. It then passes over wefts 26, 28, 30, 32 and 34, and in the same distance it passes under wefts 21, 23, 25, 27, 29 before passing over weft 31 and under weft 33. It will be noted from FIG. 3 that the odd numbered wefts, 21, 23, 25, 27, 29, 31 and 33 are disposed at the top of the fabric and even numbered wefts 22, 24, 26, 28, 30, 32 and 34 are disposed at the bottom of the fabric. In other words, alternative wefts are disposed on opposite sides of the fabric. Each weft is disposed only on its side of the fabric and does not appear in the surface of the opposite side of the fabric. Because of the remaining fabric construction, when weft 21, for example, passes under warp 11, it is still concealed on the bottom side of the fabric by the remaining yarns.

Referring to FIG. 4 the predominance of the wefts in the surfaces of the fabric will be apparent. Thus it will be seen that weft 21, for example, floats predominantly on the upper surface of the fabric whereas weft 22 floats predominantly on the lower surface.

It will also be apparent from a consideration of FIG. 3 that the warps lie almost exclusively at the interior of the fabric. Thus considering warp 12, for example, it appears at the bottom surface of the fabric beneath weft 24, and it appears at the top surface of the fabric above weft 31. Otherwise it remains in the center of the fabric.

The warps have very low crimp as will be apparent from a consideration of the fabrics in Table I.

The twenty-one specific embodiments listed in Table I of fabrics in accordance with this invention will further illustrate the invention. Each fabric was woven with 5040 denier nylon multifilament yarns in the warp and 6600 denier viscose rayon multifilament yarns in the weft.

For the fabrics shown in the drawing, the weave factors are:

| Drawing Figure | Number of Harness Used | Weave Factor |
|---|---|---|
| Fig. 1 | 7 | 1.17 |
| Fig. 5 | 5 | 1.25 |
| Fig. 6 | 4 | 1.33 |
| Fig. 7 | 3 | 1.50 |

The fabric cover is equal to the sum of the warp cover and weft cover multiplied by the weave factor:

Fabric cover = (warp cover + weft cover) × (weave factor)

The fabrics disclosed in Table I are all heavy fabrics and their weights range from 30 to 60 ounces per square

TABLE I

| Embodiment | Weave Figure | Warps Per Inch | Wefts Per Inch | Warp Cover | Weft Cover | Fabric Cover | Warp Yarn Crimp | Weft Yarn Crimp | Total Yarn Crimp (Sum of Warp Crimp Plus Weft Crimp) |
|---|---|---|---|---|---|---|---|---|---|
| A | 7 | 27.0 | 25.0 | 24.8 | 22.8 | 71.5 | 19.7 | 1.2 | 20.9 |
| B | 7 | 27.2 | 21.7 | 25.1 | 19.7 | 67.3 | 12.2 | 2.6 | 14.8 |
| C | 7 | 26.7 | 19.0 | 24.6 | 17.3 | 62.8 | 12.9 | 2.3 | 15.2 |
| D | 7 | 26.0 | 26.0 | 24.0 | 23.7 | 71.5 | 20.0 | 2.8 | 22.8 |
| E | 6 | 28.0 | 29.5 | 25.5 | 26.9 | 70.3 | 19.4 | 4.3 | 23.7 |
| F | 6 | 28.2 | 29.5 | 26.0 | 26.9 | 70.5 | 20.6 | 4.4 | 25.0 |
| G | 6 | 26.6 | 23.0 | 24.5 | 21.0 | 60.5 | 16.0 | 1.8 | 17.8 |
| H | 6 | 26.6 | 23.6 | 24.5 | 21.5 | 61.4 | 16.4 | 1.9 | 18.3 |
| I | 6 | 27.3 | 27.2 | 25.1 | 24.8 | 66.5 | 20.3 | 3.6 | 23.9 |
| J | 6 | 27.3 | 28.4 | 25.1 | 25.9 | 68.0 | 21.6 | 3.0 | 24.6 |
| K | 6 | 17.5 | 18.7 | 16.1 | 17.0 | 44.1 | 7.6 | 1.7 | 9.3 |
| L | 6 | 16.8 | 15.9 | 15.5 | 14.5 | 40.0 | 7.3 | 1.7 | 9.0 |
| M | 6 | 17.7 | 20.1 | 16.3 | 18.3 | 46.2 | 8.7 | 3.0 | 11.7 |
| N | 5 | 26.6 | 22.8 | 24.8 | 20.8 | 56.6 | 7.1 | 4.4 | 11.5 |
| O | 5 | 26.3 | 25.0 | 24.2 | 22.8 | 58.7 | 7.2 | 6.4 | 13.6 |
| P | 5 | 27.7 | 26.8 | 25.5 | 24.4 | 62.3 | 8.1 | 5.8 | 13.9 |
| Q | 5 | 27.3 | 29.0 | 25.1 | 26.4 | 64.5 | 12.0 | 6.0 | 18.0 |
| R | 1 | 27.1 | 23.2 | 25.0 | 21.1 | 53.8 | 4.8 | 4.3 | 9.1 |
| S | 1 | 28.2 | 24.0 | 26.0 | 21.9 | 55.9 | 5.6 | 4.0 | 9.6 |
| T | 1 | 28.2 | 27.2 | 26.0 | 24.8 | 59.4 | 6.3 | 4.2 | 10.5 |
| U | 1 | 28.2 | 29.0 | 26.0 | 26.4 | 61.0 | 7.9 | 4.3 | 12.2 |

The "Weave figure" column indicates the figure of the drawing in which the weave diagram for that particular fabric embodiment is shown. Thus the weave diagram for embodiment A is found in FIGS. 7 of the drawing, that for embodiment E in FIG. 6, that for embodiment N in FIG. 5 and that for embodiment R in FIG. 1. The "warps per inch," "wefts per inch," "warp yarn crimp" and "weft yarn crimp" are all well known terms in the textile arts and have their usual meanings.

The "warp cover" and "weft cover" columns refer to a well-known index of the degree of tightness or density of a band of yarns. (J. B. Dickson, Tex. Res. J., 1954, p. 1083). This index consists of the thread count, i.e. warps per inch or wefts per inch, as the case may be, divided by the product of the square root of the yarn size times the square root of the fiber density. The yarn size is given in cotton count for the calculation of this index of cover. For example, $$\text{Warp cover} = \frac{\text{(warps per inch)}}{(\sqrt{\text{yarn size}}) \times (\sqrt{\text{density}})}$$

It will be observed that these fabrics have very low warp, weft and total crimp.

The "fabric cover" is an index of the degree of tightness of the fabric. To calculate this index, the warp cover is added to the weft cover and the resultant sum is multiplied by a "weave factor." This "weave factor" is derived from the number of interlacings of the yarn in one repeat of the weave, and is calculated according to the following equation:

Weave factor = 1 + 1/(number of harness − 1)

yard. It will be noted that the fabric cover of the fabrics given in Table I range from about 40 for embodiment L to about 70 for embodiments A, D, E, F and J. It is characteristic of fabrics in accordance with this invention that the fabric cover will fall in this range. For fabrics which are to be coated with a polymeric material such as natural or synthetic rubber or plastic in the manufacture of belts and reinforced structural articles in accordance with this invention the fabric cover should be higher than the minimum of 40. Such fabrics should have a fabric cover in the range from 47 to 71. Fabrics with these higher covers are not so easily distorted in handling and in processing incident to further fabrication subsequent to the weaving thereof.

It will be noted also that the warp and weft crimps are low in fabrics in accordance with this invention. The warp crimp is not greater than about 20%, as in Examples A, D, E, F, I and J, and the total yarn crimp is not greater than about 24%, as in embodiments E, F, I, and J. In a woven fabric it is possible to get some interchange of crimp between the warp and the weft. For example, if a fabric is tensioned in the warp direction and relaxed in the weft direction, it is often possible to reduce the warp crimp and increase the weft crimp. For fabrics which are to be coated with a polymeric material such as natural or synthetic rubber or plastic in the manufacture of belt and reinforced structural articles the crimp desirably will be less; the warp crimp should be less than 18% and the total yarn crimp should be less than 20%.

FIG. 5 shows the weave diagram for embodiments N through Q in Table I. These embodiments are based on a five harness sateen weave which repeats on five warps 41, 42, 43, 44 and 45 and ten wefts 51, 52, 53, 54, 55, 56, 57, 58, 59 and 60 interlaced as shown in FIG. 5.

The fabrics of FIG. 6 are based on a four harness twill weave which repeats on four warps 61, 62, 63 and 64 and eight wefts 71, 72, 73, 74, 75, 76, 77 and 78 interlaced as shown in FIG. 6.

The fabrics of FIG. 7 are based on a three harness twill weave which repeats on three warps 81, 82 and 83 and six wefts 91, 92, 93, 94, 95 and 96 interlaced as shown in FIG. 7.

The fabrics in accordance with this invention are generally "firm" fabrics as is indicated by the warp and weft covers and fabric covers of embodiments A through U in Table I. Further in the fabrics of this invention each yarn in the fabric floats over an average of at least two yarns throughout the fabric. Of course at the points of interlacing this float pattern does not obtain, but it does obtain as an average throughout the fabric. For some embodiments it is particularly desirable to use a double-faced sateen weave such as shown in FIGS. 1 and 5 of the drawings. Such weaves often have a distinct twill line which can prevent straight tracking of a belt when they form the carcass fabric thereof, but this can be overcome by use of the pointed draw shown in FIG. 4. In many cases a straight draw can be used.

Having thus described my invention, what I claim and desire to protect by Letters Patent is:

1. A fabric comprising high strength multifilament warp yarns having a twist multiple less than about 2.0, and weft yarns capable of being adhered strongly to a polymer coating interwoven with said warp yarns, said warp and weft yarns being woven in a weave in which both faces of the fabric are composed predominantly of weft yarns, and the warp yarns being predominantly in the fabric center and regularly passing on the fabric interior side of at least two consecutive weft yarns at each side of the fabric.

2. A fabric in accordance with claim 1 in which the warp yarn crimp is not greater than about 20%.

3. A fabric in accordance with claim 2 in which the total yarn crimp in the fabric is not greater than about 24%.

4. A fabric in accordance with claim 3 in which the fabric cover is from about 40 to about 71.

5. A fabric in accordance with claim 4 in which the fabric cover is in the range from 47 to 71.

6. A fabric reinforced polymer belt having a reinforcing fabric constructed in accordance with claim 5.

7. A fabric in accordance with claim 1 in which the warp crimp is less than 18%.

8. A fabric in accordance with claim 7 in which the total yarn crimp is less than 20%.

9. A fabric in accordance with claim 8 in which the fabric cover is in the range of about 40 to about 71.

10. A fabric in accordance with claim 9 in which the fabric cover is in the range from 47 to 71.

11. A fabric reinforced polymer belt having a reinforcing fabric constructed in accordance with claim 10.

References Cited by the Examiner
UNITED STATES PATENTS

| | | | |
|---|---|---|---|
| 1,227,427 | 5/1917 | Garbau et al. | 161—91 |
| 2,090,547 | 8/1937 | Neaves | 139—426 |
| 2,866,483 | 12/1958 | Watts et al. | 139—426 X |
| 3,154,459 | 10/1964 | Cranston | 198—193 X |

FOREIGN PATENTS 848,005  9/1960  Great Britain.

MERVIN STEIN, Primary Examiner.

H. S. JAUDON, Assistant Examiner.